Sept. 1, 1931.  C. H. PHELPS  1,821,319
AXLE LEVEL
Filed Aug. 7, 1928
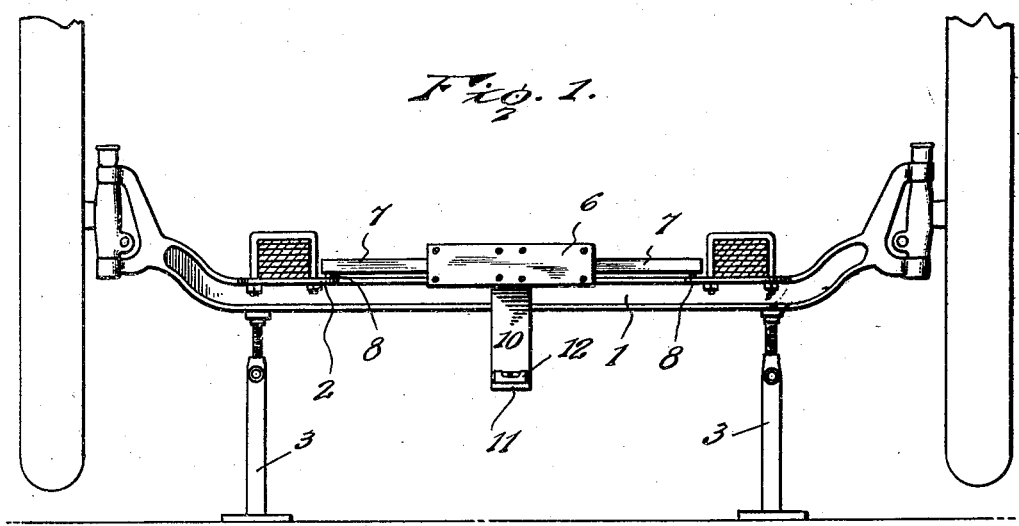
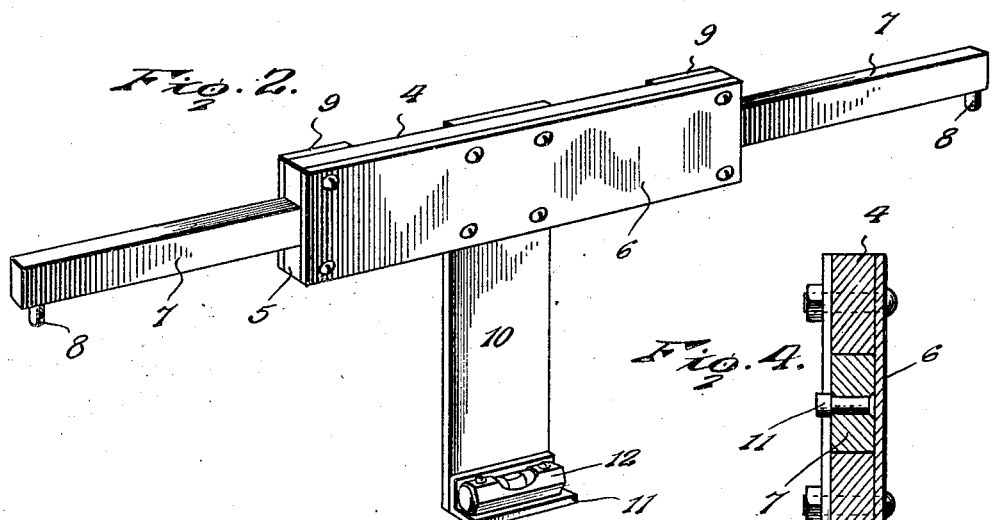
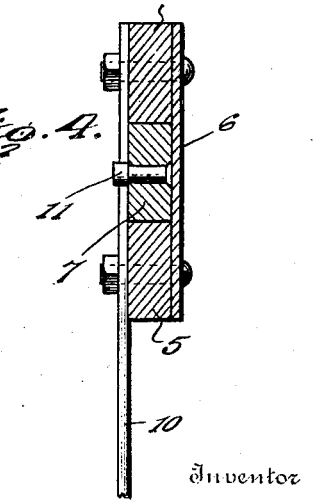
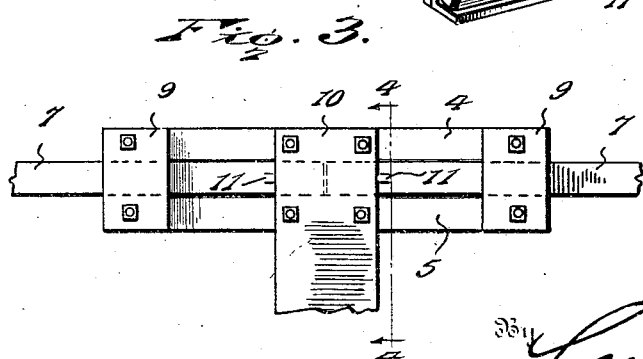
Inventor
C. H. Phelps.
By Lacey & Lacey, Attorneys Patented Sept. 1, 1931

1,821,319

UNITED STATES PATENT OFFICE

CLYDE H. PHELPS, OF BINGHAMTON, NEW YORK, ASSIGNOR, BY MESNE ASSIGNMENTS, TO ACCUROMETER MFG. CO., INC., A CORPORATION OF NEW YORK

AXLE LEVEL

Application filed August 7, 1928. Serial No. 298,007.

This invention is a gage for determining whether the axle of a vehicle is in a level position and is advantageous in operations which require the axle to be elevated to permit testing of the camber of the wheels or axle or spindle. The invention provides a very simple tool which may be easily applied to or removed from the axle and which will accurately indicate when the axle is in a level position. The invention is illustrated in the accompanying drawings and will be hereinafter fully set forth and particularly defined.

In the drawings:

Figure 1 is a sectional elevation of an axle supported upon jacks and having my improved gage applied thereto;

Fig. 2 is an enlarged perspective view of the gage;

Fig. 3 is a rear elevation of a portion of the gage, and

Fig. 4 is an enlarged detail section on the line 4—4 of Fig. 3.

The axle 1 is of the usual construction employed in the front axles of automobiles and is provided with spring seats 2 of the usual type. In certain operations, such as testing the camber of the axle or the pitch of the steering wheels, it is usual practice to support the axle upon jacks, indicated at 3, disposed under the respective ends of the axle and it is obviously desirable that the axle be supported in an exactly level state. My present invention provides a very simple tool for showing whether or not the axle is level.

In constructing a tool according to the present invention, there are provided upper and lower bars 4 and 5 which are arranged in parallelism and are connected and held in spaced relation at one side by a face plate 6, as shown. Slidably supported by and between the bars 4 and 5 are slides or gage bars 7 which project beyond the ends of said bars and are provided at their outer extremities on their under sides with studs or lugs 8 which are adapted to rest upon the spring seats 2, and the slidable mounting of these elements permits them to be adjusted to the width of the particular axle which is under test. The slides are held in place between the bars 4 and 5 by cap plates 9 secured to the backs of the bars 4 and 5 at the ends of the same, and also by a central plate or hanger 10 which is secured to said frame bars 4 and 5 and depends therefrom, as shown, the inner edges of the cap plates constituting abutments, as will presently appear. On the sides of the slides adjacent the inner ends thereof are stop lugs 11 which are adapted to impinge against the edges of the hanger 10, as shown in Fig. 3, and thereby limit the inward movement of the slides and also to impinge against the inner edges of the cap plates 9 and limit the outward movement of the slides. The slides may thus be easily adjusted to the spacing of the spring seats and the springs resting thereon while they are prevented from being accidentally entirely withdrawn from between the frame bars. At the lower end of the hanger 10 is a ledge or lip 11 carrying a spirit level 12 which may be of any approved construction, and may be easily read without requiring the workman to shift his position inasmuch as he is required merely to glance down at the level.

In use, the tool is set on the spring seats, as shown in Fig. 1, so that the hanger 10 will depend in front of the axle at the center of the same, and it will, therefore, be obvious that, if the axle is inclined, the fact will be shown by the level 12, whereas, if the axle be exactly level, the marker or bubble of the level 12 will be at the zero point and the operator will be visually informed that the axle is supported in the desired level state.

My improved tool is obviously simple in the construction and arrangement of its parts and may, therefore, be produced at a low cost and is not apt to get out of order. The action of the gage is entirely automatic after it is set in place and it may be easily removed after its purpose has been served inasmuch as it is not necessary to secure it to the axle or the spring seats but it is merely rested thereon so that, when the axle is properly supported, the tool may be simply lifted therefrom. The frame bars 4 and 5 and the several plates and the hanger are rigidly secured together so that the bars will be firmly held in the desired relation and the accuracy of the device is not apt to be disturbed. It may be noted that the upper and lower edges of the frame bars are right lines and the upper end edge of the hanger is at a right angle to its side edges so that, if the hanger be placed in position with its upper end edge flush with the upper edge of the frame bar 4, the hanger will depend from the body of the tool at a right angle thereto and accuracy in the reading of the level will be attained. It will be understood, of course, that the ledge or lip 11 is parallel with the upper and lower edges of the frame bars 4, and the upper and lower sides of the slides 7 are parallel with each other and with the upper and lower edges of the frame bars. The studs 8 are, of course, of exactly the same length so that, when the tool is placed in position, the slides will be parallel with the axle.

Having thus described the invention, I claim:

A gage for the purpose set forth comprising upper and lower parallel frame bars, plates connecting said bars in fixed relation, slides mounted between said bars and plates to project beyond the ends of the same and be supported at their outer ends by an axle, a hanger depending centrally from the frame bars at a right angle thereto, a level carried by the lower end of the hanger parallel with the frame bars, and supporting studs on the under sides of the slides at the outer ends of the same.

In testimony whereof I affix my signature.

CLYDE H. PHELPS.